United States Patent Office 3,338,968
Patented Aug. 29, 1967

3,338,968
PROCESS FOR THE PREPARATION OF PRIMARY 1,1-DIHYDROPOLYFLUOROALKYL AMINES
Samuel E. Ellzey, Jr., and James S. Wittman III, New Orleans, La., William J. Connick, Jr., Edgewood, Md., and Wilma A. Guice, New Orleans, La., assignors to the United States of America as represented by the Secretary of Agriculture
No Drawing. Filed Jan. 29, 1965, Ser. No. 429,174
20 Claims. (Cl. 260—583)

A non-exclusive, irrevocable, royalty-free license in the invention herein described, throughout the world for all purposes of the United States Government, with the power to grant sublicenses for such purposes is hereby granted to the Government of the United States of America.

This invention relates to the preparation of primary 1,1-dihydropolyfluoroalkyl amines. More specifically, it relates to a process for the preparation of these primary amines by the reduction of the corresponding nitriles with sodium borohydride at atmospheric pressures. The novel process of this invention eliminates the use of high pressures and the potentially dangerous lithium aluminum hydride.

The primary 1,1-dihydropolyfluoroalkyl amines of the present invention may be represented by the general formula

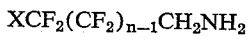

in which $n$ is an integer from one to eight inclusive, and X may be F or H.

When X is F, these primary amines are useful as chemical intermediates especially for introducing polyfluorocarbon groups into a molecule by well-known reactions of conventional organic chemistry. Certain members of this class also may be used in conjunction with conventional textile-finishing agents for treating textiles to secure new and useful properties. When X is H, these primary amines are also useful as chemical intermediates and their acid salts are especially useful as dispersing agents.

Primary 1,1-dihydropolyfluoroalkyl amines of the above formula in which X=F have been prepared by reduction of the corresponding nitriles with hydrogen at high pressure over a platinum catalyst by Gilman and Jones (J. Am. Chem. Soc., 65, 1458 (1943)) or a Raney nickel catalyst by Buckle and Saunders (J. Chem. Soc., 1949, 2774), or by the reaction of the corresponding alkyl chlorides with ammonia under pressure by Benning and Park (U.S. Patent 2,348,321, issued May 9, 1954). They have also been prepared by reduction of the corresponding carboxamides with lithium aluminum hydride (British Patents 689,425, issued Mar. 25, 1953, and 717,232, issued Oct. 27, 1954); or by the reduction of the corresponding nitriles with lithium aluminum hydride by Sander (Monatsch. Chem., 95, 608 (1964)). Other methods include the use of amides of the type $$CF_3(CF_2)_{n-1}CH_2CONH_2$$

or azides of the type $CF_3(CF_2)_{n-1}CH_2CON_3$ in the Hofmann or Curtius reaction, respectively, by Henne and Stewart (J. Am. Chem. Soc., 77, 1901 (1955)).

Primary 1,1-dihydropolyfluoroalkyl amines of the above formula in which X=H have been prepared by Carnahan and Sampson from the corresponding carboxamides by lithium aluminum hydride reduction (U.S. Patent 2,646,449, issued July 21, 1953).

The above methods have several disadvantages.

The catalytic reduction methods require the use of high pressure as does the alkyl chloride-ammonia reaction. Also, in the latter method a large amount of secondary amine may be produced.

The Hofmann and Curtius reactions, besides requiring starting materials which are much more inaccessible than those of the present invention, give low yields of the desired product in addition to undesirable byproducts.

As is well documented for the case of the lithium aluminum hydride reduction of fluorinated amides, extreme caution must be taken to prevent the occurrence of fire and explosion during product work-up, both because of the sensitivity of the complex intermediates formed in the reaction and because of the violent reaction of excess hydride with water (Lovelance, Rausch, and Postelnek, "Aliphatic Fluorine Compounds," p. 285, A. C. S. Monograph No. 138, Reinhold, New York, 1958). In general, extraordinary precautions must be taken with many reactions involving lithium aluminum hydride.

The process of the present invention overcomes the necessity of using high pressures and the potentially dangerous lithium aluminum hydride process by making use of the reduction of a polyfluoroalkyl nitrile of the formula $XCF_2(CF_2)_{n-1}CN$, where $n$ and X have the same meaning as above, with a much less reactive complex hydride, sodium borohydride. The process of the present invention was unexpected because the nonfluorinated alkyl nitriles of conventional organic chemistry are *not* reduced by sodium borohydride under normal conditions ("Reductions with Complex Metal Hydrides," N. G. Gaylord, Interscience, New York, 1956, p. 750). The success of this reduction in the present case may be due to the strong inductive effect of the highly electronegative fluorinated chain adjacent to the nitrile function, although we are not limiting our invention to this explanation.

More specifically, by the process of the present invention a polyfluoroalkyl nitrile, which may be prepared by known methods from readily available starting materials, is treated with an equimolar quantity, preferably an excess, of sodium borohydride ($NaBH_4$) in an inert ether solvent such as the dimethyl ether of diethyleneglycol (diglyme), or the dimethyl ether of triethyleneglycol (triglyme), and the like.

Although the desired amine will be formed if the molar ratio of nitrile to sodium borohydride is 1:1 or higher, the preferred ratio is about 1:2 because of increased yields of the product amines.

Reaction temperatures useful in the practice of this invention may range from about ambient room temperature, or lower, to about 225° C. or higher, although the preferred range is from about 25° to about 192° C. (the boiling point of triglyme). The reaction is exothermic and cooling may be necessary to maintain the lower reaction temperatures which are preferred when lower boiling nitriles are used. Another method is to add the nitrile slowly to reduce the rate of heat formation due to the exothermic reaction. The higher reaction temperatures are preferred when the higher boiling nitriles are used. It is an advantage of the process of our invention that low boiling polyfluoroalkyl nitriles, such as perfluoroacetonitrile, for example, may be used. The reaction is continued until all of the nitrile has been consumed.

As will be noted below in the examples, for laboratory production a 500 ml. three-necked flask equipped with a magnetic stirrer, temperature measuring means, addition funnel for liquid nitriles, and a condenser equipped with cooling means is satisfactory for the reduction of the nitrile.

In one procedure, after the nitrile is consumed, which may require a period of time varying from a few minutes to an hour or more, the reaction mixture is treated with an aqueous solution of an alkanoic acid, such as acetic acid, to decompose any excess hydride. In this step the danger of fire and/or explosion is quite remote, since no dangerous complex intermediates are formed with sodium borohydride, and the hydride itself is smoothly decomposed by acids. The mixture is then made strongly alkaline to free the amine, and the free amine is removed from the reaction mixture by ether extraction, isolated by evaporation of the dried ether extract, and subsequently purified by distillation, after which it is recovered. Alternatively, the amine, either while still in the crude reaction mixture or after ether extraction, may be converted to its hydrochloride salt using hydrogen chloride, isolated, and recovered. Treatment of the salt with alkali then liberates the free amine which may be recovered in the usual manner.

In the preferred procedure, after the nitrile is consumed, the reaction mixture is treated with aqueous alkali and then steam distilled. When the resulting amine is sufficiently insoluble in the distillate which consists of a mixture of water, amine, and diglyme, the amine layer is separated by suitable means, such as a separatory funnel, then dissolved in ether, washed with water to free the amine of traces of diglyme, and the primary amine is recovered by evaporating the ether therefrom. When the amine is soluble in the steam distillate, it is separated by ether extraction of the distillate and the extract is treated with hydrogen chloride gas. The hydrochloride salt is then recovered by evaporation to dryness. Alternatively, the extract may be dried with sodium sulfate and the free amine is recovered by distillation.

The following examples are intended to serve as illustrations of the practice of this invention and should not be construed as limiting the scope of the invention. Temperatures are in degrees centigrade.

Example 1

To a well-stirred slurry of 7.21 g. (0.191 mole) of sodium borohydride in 50 ml. of refluxing diglyme contained in a 500 ml. three-necked flask, equipped with a magnetic stirrer, water-cooled condenser, thermometer, and addition funnel, was added over 15 min. 37.68 g. (0.095 mole) of pentadecafluorocaprylonitrile. The foaming reaction mixture was held at the reflux temperature with stirring for 1.5 hours after the addition. After cooling, the mixture was poured into 100 ml. of ice water and 100 ml. of 20% acetic acid was cautiously added with stirring. To the acidic mixture was added concentrated sodium hydroxide until the mixture was strongly alkaline. Three 100 ml. portions of ether were used to extract the free amine and the extract was saturated with hydrogen chloride. The precipitated hydrochloride was filtered and washed with ether. The white powder weighed 26.08 g. (62.9% yield), M.P. 282° (dec.) (sealed capillary). Several recrystallizations from ethanol gave an analytical sample, M.P. 278–280° (dec.) (sealed capillary).

*Analysis.*—Calcd. for $C_4H_5ClF_{15}N$: C, 22.06; H, 1.16; F, 65.43. Found: C, 21.70; H, 1.65; F, 65.46.

To 24.20 g. (0.056 mole) of the hydrochloride suspended in 50 ml. of water was added 20 ml. of 50% sodium hydroxide. After warming for 30 minutes, the mixture was cooled and extracted with 100 ml. and two 50 ml. portions of ether and the extract was dried over sodium sulfate. Upon distillation there was obtained 15.34 g. (69% yield) of 1,1-dihydropentadecafluorooctylamine, B.P. 76–80° at 50 mm., $n_D^{27}$ 1.3056–1.3063. A sample was further purified by distillation, B.P. 75–75.5° at 50 mm., $n_D^{27}$ 1.3051.

*Analysis.*—Calcd. for $C_8H_4F_{15}N$: C, 24.07; H, 1.01; F, 71.41; N, 3.51. Found: C, 24.11; H, 1.08; F, 71.34; N, 3.80.

Example 2

To a refluxing, stirred slurry of 2.00 g. (0.053 mole) of sodium borohydride in 20 ml. of diglyme was added over 7 min. 10.00 g. (0.025 mole) of pentadecafluorocaprylonitrile. Refluxing was continued for 1.5 hours after the addition was complete and the mixture was cooled. A sample of the reaction mixture was examined by gas-liquid chromatography on an SE–30 column and was found to contain only traces of both unchanged nitrile and the expected amine plus a fair amount of an unidentified material in addition to the solvent diglyme. Water was cautiously added along with 10 ml. of 50% sodium hydroxide until the total volume of added water was 200–250 ml. The mixture was then steam distilled and the lower amine layer, 9.01 g., was separated and found to contain 85% 1,1-dihydroperfluorooctylamine and 15% diglyme (75.9% yield of amine). Dissolving the crude amine in ether and washing with about ten times its volume of water gave the pure amine after the ether was distilled.

Example 3

An intimate mixture of 25.0 g. (0.117 mole) of perfluorobutyramide and 50 g. (0.352 mole) of phosphorus pentoxide contained in a flask summounted by a Dry Ice-acetone reflux condenser was heated to about 140–170° for about 1.5 hours. By allowing the reflux condenser to warm slowly the perfluorobutyronitrile formed was allowed to distill into two traps cooled by Dry Ice-acetone. The trapped nitrile was then slowly distilled into a stirred slurry of 8.85 g. (0.234 mole) of sodium borohydride and 140 ml. of diglyme at about 25° which was surmounted by a reflux condenser cooled with Dry Ice-acetone. The addition took about 1.5 hours and the reaction temperature rose to about 32°. At the end of the addition the pot containing the phosphorus pentoxide was heated to 240° and a nitrogen stream was used to transfer the last traces of nitrile to the flask containing the sodium borohydride. About 150 ml. of water and 10 ml. of 50% sodium hydroxide were cautiously added to the reaction mixture which was then steam distilled until about 450 ml. of distillate was collected. The distillate was extracted with 50 ml. and four 25 ml. portions of ether. After saturating the extract with hydrogen chloride, the solvent was removed on a water bath with an air stream and the crude 1,1-dihydroheptafluorobutylamine hydrochloride was collected. After washing with ether and drying, the hydrochloride weighed 12.33 g., M.P. 310–314° (dec.) (sealed capillary). About 0.6 g. of the starting amide was recovered from the phosphorus pentoxide by an ether washing to give a corrected yield of amine hydrochloride of 46.1%. The neutralization equivalent of the salt was found to be 235 (theoretical 234.5). Treatment with sodium hydroxide gave 1,1-dihydroheptafluorobutylamine, B.P. 66–66.5°, on distillation from barium oxide. The amine formed an acetyl derivative. M.P. 50.5–52°, with acetic anhydride.

Example 4

ω-Hydroperfluorononanoic acid (45.75 g., 0.102 mole) was refluxed with 100 ml. of absolute ethanol and 10 ml. of concentrated sulfuric acid for 24 hours. After pouring the reaction mixture into 500 ml. of ice water, the ester was extracted with ether, washed with ice water and ice cold 5% sodium bicarbonate, dried over sodium sulfate, and distilled. The crude ester distilled at 96–107° at 20 mm. and weighed 22.38 g. (46.3%), $n_D^{24}$ 1.3206. Gas chromatography revealed the presence of a small amount of an impurity. Redistillation gave an analytical sample, B.P. 112° at 40 mm., $n_D^{25}$ 1.3203. Its infrared spectrum in chloroform had ester C=O absorption at 5.64 microns.

*Analysis.*—Calcd. for $C_{11}H_6F_{16}O_2$: C, 27.86; H, 1.28; F, 64.11. Found: C, 26.25; H, 1.29; F, 63.02.

To a solution of 22.18 g. (0.047 mole) of the above ester in 50 ml. of ether was added gaseous ammonia until the solution was saturated. After evaporation of the ether, 19.62 g. (93.6%) of crude ω-hydroperfluorononanamide, M.P. 136–138°, was obtained. The infrared spectrum of the amide in a potassium bromide disc showed NH stretch at 3.00 and 3.18 microns, C=O at 5.90 microns, and the amide II band at 6.22 microns.

The above amide (19.62 g., 0.044 mole) was heated with 25 g. of phosphorus pentoxide at about 200° and maintained at this temperature for 20 minutes after refluxing began. From the mixture was distilled 11.07 g. of 1,1,9-trihydroperfluorononylamine, B.P. about 140°. An additional 5.22 g. (total of 86.1%) was distilled at 80 mm., B.P. 82°. Two further distillations gave an analytical sample, B.P. 144°, having C≡N absorption at 4.44 microns.

*Analysis.*—Calcd. for $C_9HF_{16}N$: C, 25.31; H, 0.24; F, 71.18; N, 3.28. Found: C, 24.38; H, 0.15; F, 72.84; N, 3.23.

To a slurry of 2.60 g. (0.069 mole) of sodium borohydride in 100 ml. of diglyme maintained at 100° was added with stirring 14.50 g. (0.0339 mole) of the above nitrile over about 10 min. Reflux was started and maintained for 1.5 hours. After cooling the mixture, ice water and 10 ml. of 50% sodium hydroxide was added slowly. The mixture was then steam distilled and about 300 ml. of distillate was collected. The distillate was thoroughly extracted with ether and hydrochloric acid was added to precipitate the hydrochloride salt. The mixture was then cooled well and the salt was filtered and washed well with ice water. The weight of ω-hydroperfluorononylamine hydrochloride was 10.48 g. (66.1%), M.P. 264–266° (preheated to 255° in a sealed capillary). The neutralization equivalent observed on titration with sodium hydroxide was 476 (theoretical 468). Treatment of the hydrochloride with 50% sodium hydroxide, followed by ether extraction and distillation gave 1,1,9-trihydroperfluorononylamine, B.P. 84–90° at 12–14 mm. The infrared spectrum of the pure amine showed NH stretch at 2.96 and 3.02 microns; the hydrochloride salt showed NH stretch at 2.95 microns.

We claim:

1. A process for preparing primary 1,1-dihydropolyfluoroalkyl amines represented by the general formula $XCF_2(CF_2)_{n-1}CH_2NH_2$, where $n$ is an integer from one to eight and X is H or F, from polyfluoroalkyl nitriles of the formula $XCF_2(CF_2)_{n-1}CN$, where $n$ and X have the same meaning as above, which process comprises the following steps:
    (a) reacting at least one molar proportion of the nitrile with at least one molar proportion of sodium borohydride in the presence of an inert ether solvent;
    (b) continuing the reaction until the nitrile is consumed;
    (c) treating the reaction mixture with an aqueous alkali until the mixture is strongly alkaline, said alkali being at least one of the group consisting of sodium hydroxide and potassium hydroxide;
    (d) removing the amine from the reaction mixture by steam distillation;
    (e) separating the amine from the aqueous distillate;
    (f) dissolving the amine solution in ether;
    (g) washing the ether solution of amine with water to free it of traces of solvent; and
    (h) recovering the primary amine by evaporating the ether therefrom.

2. The process according to claim 1 wherein the molar ratio of sodium borohydride to nitrile is two-to-one.

3. The process according to claim 1 wherein the inert ether solvent is diglyme (dimethyl ether of diethylene glycol).

4. The process according to claim 3 wherein $n$ is an integer 1, 2, or 3, X is F, and the temperature of the reaction is about 25° C.

5. The process according to claim 3 wherein $n$ is three and X is F.

6. The process according to claim 3 wherein $n$ is an integer greater than three and less than nine, X is F, and the temperature is the reflux temperature of the inert ether solvent.

7. The process according to claim 6 wherein $n$ is seven and X is F.

8. The process according to claim 6 wherein $n$ is eight and X is H.

9. The process according to claim 1 wherein the reaction mixture of step (c) is acidified with an aqueous solution of an alkanoic acid prior to treatment with the aqueous alkaline solution.

10. The process according to claim 9 wherein the alkanoic acid is acetic acid.

11. The process according to claim 1 wherein the amine in the ether solution of step (g) is converted to the hydrochloride salt which is then isolated and recovered.

12. A process for preparing primary 1,1-dihydropolyfluoroalkyl amines represented by the general formula $XCF_2(CF_2)_{n-1}CH_2NH_2$, where $n$ is an integer from one to eight and X is H or F, from polyfluoroalkyl nitriles of the formula $XCF_2(CF_2)_{n-1}CN$, where $n$ and X have the same meaning as above, which process comprises the following steps:
    (a) reacting at least one molar proportion of the nitrile with at least one molar proportion of sodium borohydride in the presence of an inert ether solvent;
    (b) continuing the reaction until the nitrile is consumed;
    (c) treating the reaction mixture with an aqueous solution of an alkanoic acid;
    (d) treating the reaction mixture of step (c) with an aqueous solution of an alkali until the mixture is strongly alkaline to free the amine;
    (e) removing the free amine from the reaction mixture by ether extraction;
    (f) isolating the free amine by evaporating the ether;
    (g) purifying the amine by distillation; and thereafter
    (h) recovering the purified amine.

13. The process according to claim 12 wherein the molar ratio of sodium borohydride to nitrile is two-to-one.

14. The process according to claim 12 wherein the inert ether solvent is diglyme (dimethyl ether of diethylene glycol).

15. The process according to claim 14 wherein $n$ is an integer, 1, 2, or 3, X is F, and the temperature of the reaction is about 25° C.

16. The process according to claim 14 wherein $n$ is three and X is F.

17. The process according to claim 14 wherein $n$ is an integer greater than three and less than nine, X is F, and the temperature is the reflux temperature of the inert ether solvent.

18. The process according to claim 17 wherein $n$ is seven and X is F.

19. The process according to claim 17 wherein $n$ is eight and X is H.

20. The process according to claim 14 wherein the ether extracted amine of step (e) is converted to the hydrochloride salt, isolated, and recovered.

References Cited

UNITED STATES PATENTS 2,348,321   5/1944   Benning et al. _____ 260—583

CHARLES B. PARKER, *Primary Examiner.*

R. L. RAYMOND, *Assistant Examiner.*